United States Patent
Knudson et al.

(10) Patent No.: US 9,479,840 B2
(45) Date of Patent: *Oct. 25, 2016

(54) SERIES REMINDERS AND SERIES RECORDING FROM AN INTERACTIVE TELEVISION PROGRAM GUIDE

(71) Applicant: Rovi Guides, Inc., Santa Clara, CA (US)

(72) Inventors: Edward B. Knudson, Lakewood, CO (US); Thomas R. Lemmons, Evergreen, CO (US); Kevin D. Satterfield, Mannford, OK (US); Donald W. Allison, Tulsa, OK (US); Michael D. Ellis, Boulder, CO (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,655

(22) Filed: Nov. 2, 2015

(65) Prior Publication Data
US 2016/0100229 A1    Apr. 7, 2016

Related U.S. Application Data

(63) Continuation of application No. 14/184,404, filed on Feb. 19, 2014, which is a continuation of application No. 14/183,223, filed on Feb. 18, 2014, now Pat. No. 9,032,445, which is a continuation of application No.

(Continued)

(51) Int. Cl.
*H04N 5/445*    (2011.01)
*H04N 21/488*   (2011.01)
(Continued)

(52) U.S. Cl.
CPC ...... *H04N 21/4882* (2013.01); *H04N 5/44543* (2013.01); *H04N 5/76* (2013.01);
(Continued)

(58) Field of Classification Search
CPC ........... H04N 21/47214; H04N 5/782; H04N 5/44543

USPC .......... 725/50, 51, 55, 58, 87–104; 709/217–232

See application file for complete search history.

(56) References Cited

U.S. PATENT DOCUMENTS

| 4,488,179 A | 12/1984 | Krüger et al. |
| 4,606,726 A * | 8/1986 | Pash ........... A63F 9/00 369/277 |

(Continued)

OTHER PUBLICATIONS

U.S. Appl. No. 60/088,888, filed Jun. 11, 1998, Edward B. Knudson.

(Continued)

*Primary Examiner* — Annan Shang
(74) *Attorney, Agent, or Firm* — Ropes & Gray LLP

(57) ABSTRACT

An interactive television program guide system with program series reminder and recording capabilities is provided. The system allows a user to set a reminder or schedule a recording for a single episode or for each episode of a program series. In addition, other options may be provided that allow the user to determine, for example, whether to schedule reminders/recordings for episodes on all channels on which the program airs or only on a selected channels, whether to schedule reminders/recordings for all episodes including reruns or only new episodes, whether to schedule reminders/recordings for network or syndicated episodes, and whether to schedule reminders/recordings for episodes on all days or only on selected days of the week. Before the scheduled broadcast time of each episode of each selected program series, the system sends a reminder message to the user that reminds the user of the program episode or sends a record command to a videocassette recorder to initiate recording of the episode. The system allows a user to view a list of all currently requested program reminders and scheduled program recordings. The user may update, change, or cancel any entry in either list or the system may automatically update the lists to match new broadcast schedule information. If the user sets a reminder or schedules a recording that conflicts with an existing reminder or recording, the system may inform the user of the conflict and allow the user to resolve the conflict or the system may resolve the conflict.

20 Claims, 19 Drawing Sheets

Related U.S. Application Data

11/894,698, filed on Aug. 20, 2007, now Pat. No. 8,745,669, which is a continuation of application No. 11/183,536, filed on Jul. 18, 2005, now abandoned, which is a continuation of application No. 10/929,111, filed on Aug. 26, 2004, now abandoned, which is a continuation of application No. 09/330,792, filed on Jun. 11, 1999, now abandoned.

(60) Provisional application No. 60/088,888, filed on Jun. 11, 1998.

(51) Int. Cl.

| | | |
|---|---|---|
| H04N 5/76 | (2006.01) | |
| H04N 5/782 | (2006.01) | |
| H04N 21/472 | (2011.01) | |
| H04N 9/79 | (2006.01) | |
| H04N 21/4147 | (2011.01) | |
| H04N 21/482 | (2011.01) | |
| H04N 21/61 | (2011.01) | |
| H04N 21/6543 | (2011.01) | |
| H04N 21/84 | (2011.01) | |

(52) U.S. Cl.
CPC .............. *H04N 5/782* (2013.01); *H04N 9/79* (2013.01); *H04N 21/4147* (2013.01); *H04N 21/47214* (2013.01); *H04N 21/482* (2013.01); *H04N 21/4828* (2013.01); *H04N 21/6143* (2013.01); *H04N 21/6543* (2013.01); *H04N 21/84* (2013.01); H04N 2005/44547 (2013.01)

(56) References Cited

U.S. PATENT DOCUMENTS

| | | | |
|---|---|---|---|
| 4,954,981 A | | 9/1990 | Dehner, Jr. et al. |
| 5,027,400 A | * | 6/1991 | Baji ............... G09F 27/00 348/E7.069 |
| 5,036,314 A | | 7/1991 | Barillari et al. |
| 5,050,010 A | | 9/1991 | Park |
| 5,151,789 A | | 9/1992 | Young |
| 5,371,707 A | * | 12/1994 | Ogawa ............... G11C 11/4099 365/149 |
| 5,396,612 A | | 3/1995 | Huh et al. |
| 5,410,344 A | | 4/1995 | Graves et al. |
| 5,412,720 A | * | 5/1995 | Hoarty ............... G06F 3/04815 348/E5.105 |
| 5,434,626 A | | 7/1995 | Hayashi et al. |
| 5,440,678 A | | 8/1995 | Eisen et al. |
| 5,481,296 A | | 1/1996 | Cragun et al. |
| 5,485,321 A | | 1/1996 | Leonhardt et al. |
| 5,528,304 A | * | 6/1996 | Cherrick ............ H04N 5/44513 348/563 |
| 5,585,838 A | | 12/1996 | Lawler et al. |
| 5,732,216 A | | 3/1998 | Logan et al. |
| 5,805,763 A | | 9/1998 | Lawler et al. |
| 5,903,454 A | | 5/1999 | Hoffberg et al. |
| 5,991,498 A | | 11/1999 | Young |
| 6,078,348 A | | 6/2000 | Klosterman et al. |
| 6,163,316 A | | 12/2000 | Killian |
| 6,177,931 B1 | | 1/2001 | Alexander et al. |
| 6,185,360 B1 | | 2/2001 | Inoue et al. |
| 6,199,076 B1 | | 3/2001 | Logan et al. |
| 6,208,799 B1 | | 3/2001 | Marsh et al. |
| 6,347,182 B1 | | 2/2002 | Okada et al. |
| 6,370,274 B1 | | 4/2002 | Peters et al. |
| 6,396,544 B1 | | 5/2002 | Schindler et al. |
| 6,424,791 B1 | | 7/2002 | Saib |
| 7,151,886 B2 | | 12/2006 | Young et al. |
| 7,231,130 B2 | | 6/2007 | Ohno et al. |
| 7,552,459 B2 | | 6/2009 | Klosterman et al. |
| 2001/0043795 A1 | | 11/2001 | Wood et al. |

OTHER PUBLICATIONS

U.S. Appl. No. 09/330,792, filed Jun. 11, 1999, Edward B. Knudson.
U.S. Appl. No. 10/929,111, filed Aug. 26, 2004, Edward B. Knudson.
U.S. Appl. No. 11/149,372, filed Jun. 8, 2005, Edward B. Knudson.
U.S. Appl. No. 11/183,536, filed Jul. 18, 2005, Edward B. Knudson.
U.S. Appl. No. 11/894,698, filed Aug. 20, 2007, Edward B. Knudson.
U.S. Appl. No. 12/780,693, filed May 14, 2010, Edward B. Knudson.
U.S. Appl. No. 12/780,697, filed May 14, 2010, Edward B. Knudson.
U.S. Appl. No. 12/780,699, filed May 14, 2010, Edward B. Knudson.
U.S. Appl. No. 14/183,223, filed Feb. 18, 2014, Edward B. Knudson.
U.S. Appl. No. 14/184,404, filed Feb. 19, 2014, Edward B. Knudson.
U.S. Appl. No. 14/445,324, filed Jul. 29, 2014, Edward B. Knudson.
U.S. Appl. No. 14/703,645, filed May 4, 2015, Edward B. Knudson.

\* cited by examiner

90

| | Seinfeld (0:30), Ch. 4, 7:00pm | July 9, 1997 |

Reminder Options

Schedule Reminder For:
○ This Episode
● Entire Series

Program Channels:
○ This Channel  ○ Selected Channels
○ All Channels

How Soon Before Event Do You Want To Be Reminded?
○ [3] Minutes (1-15)  ○ Other

Program Days:
○ This Day  ○ Selected Days
○ All Days

Program Type:
○ First-Run  ○ Rerun  ○ All
○ Network  ○ Syndicated
○ Unviewed Only

| OK | Cancel | Record | View Current Reminders |

**How Soon Before Event
Do You Want To Be Reminded?**

○ 1 Hour      ○ Days  : \_\_\_\_\_

○ 1 Day        Hours  : \_\_\_\_\_

○ 2 Days      Minutes: \_\_\_\_\_

115

117    119

Enter      Exit

| Current Reminders | | | |
|---|---|---|---|
| Program | Episodes | Reminder | Submitted |
| Seinfeld | July 9, 1997<br>Ch. 4, 7:00PM | 1 Hour Before;<br>Rerun | July 5, 1997<br>At 3:04PM |
| This Week<br>With<br>Sam & Cokie | Series<br>Sunday, July 10<br>10:30AM, Ch. 7 | 1 Day Before:<br>New (First-Run) | July 8, 1997<br>At 5:09PM |
| Seinfeld | July 14, 1997<br>Ch. 11, 11:00PM | 1 Hour Before;<br>Rerun | July 9. 1997<br>At 5:03PM |
| This Week<br>With<br>Sam & Cokie | Series<br>Sunday, July 17<br>10:30AM, Ch. 7<br>July 24 | 1 Day Before;<br>New (First-Run) | July 8, 1997<br>At 5:09PM |
| View Current<br>Recordings | Cancel | | Exit |

| | Seinfeld (0:30), Ch. 4, 7:00pm | July 9, 1997 |

Update Reminder

Update Reminder For:
○ This Episode
● Entire Series

Program Channels:
○ This Channel   ○ Selected Channels
○ All Channels

How Soon Before Event Do You Want To Be Reminded?
○ ☐ Minutes (1-15)   ○ Other

Program Days:
○ This Day   ○ Selected Days
○ All Days

Program Type:
○ First-Run   ○ Rerun   ○ All
○ Network   ○ Syndicated
○ Unviewed Only

| OK | Cancel Series Reminder | Cancel Current Episode Reminder | Exit |

| | Current Recordings | |
|---|---|---|
| Program | Episodes | Submitted |
| Seinfeld | July 9, 1997<br>Ch. 4, 7:00PM<br>(Rerun) | July 5, 1997<br>At 3:04PM |
| This Week<br>With<br>Sam & Cokie | Entire<br>Series<br>Sunday; Ch. 7<br>10:30AM, First Run<br>July 10<br>July 17<br>↓ | July 8, 1997<br>At 5:09PM |
| View Current<br>Reminders | Cancel | Exit |

171 — Seinfeld
177 — View Current Reminders
178 — Cancel
179 — Exit

| | | | | |
|---|---|---|---|---|
| 181 → | Current Reminders | | | |
| Program | Episodes | Reminder | Submitted | |
| X | May 3, 1997<br>Monday<br>Ch. 4, 8:00PM | 1 Hour<br>Before<br>Rerun | May 1, 1997<br>At 1:30PM | Conflict ⎫ |
| Y | Series:<br>Mondays<br>Ch. 7, 8:00PM | ⋮ | ⋮ | ⎬ 183 |
| Z | May 3, 1997<br>May 9, 1997<br>Ch. 11, 9:00PM | | | Conflict ⎭ |
| Y | Series:<br>↑ May 10, 1997<br>↓ May 17, 1997 | | | |
| View Current Recordings | Cancel | | Exit | |

| | Current Reminders | | |
|---|---|---|---|
| Program | Episodes | Submitted | |
| X | May 3, 1997 Monday Ch. 4, 8:00PM | May 1, 1997 At 1:30PM | Conflict |
| Y | Series: Mondays Ch. 7, 8:00PM | May 2, 1997 At 5:00PM | Conflict |
| Z | May 3, 1997 May 9, 1997 Ch. 11, 9:00PM | ⋮ | |
| Y | Series: May 10, 1997 May 17, 1997 | | |

191 → Current Reminders

194 → Conflict

Resolve Conflicts — 193

FIG. 14

SERIES REMINDERS AND SERIES RECORDING FROM AN INTERACTIVE TELEVISION PROGRAM GUIDE

REFERENCE TO RELATED APPLICATIONS

This application is a continuation of U.S. patent application Ser. No. 14/184,404, filed Feb. 19, 2014, currently pending, which is a continuation of U.S. patent application Ser. No. 14/183,223 filed Feb. 18, 2014 (now U.S. Pat. No. 9,032,445), which is a continuation of U.S. patent application Ser. No. 11/894,698 filed Aug. 20, 2007 (now U.S. Pat. No. 8,745,669), which is a continuation of U.S. patent application Ser. No. 11/183,536 filed Jul. 18, 2005 (now abandoned), which is a continuation of U.S. patent application Ser. No. 10/929,111 filed Aug. 26, 2004 (now abandoned), which is a continuation of U.S. patent application Ser. No. 09/330,792 filed Jun. 11, 1999 (now abandoned), which claims priority to U.S. Provisional Application No. 60/088,888 filed Jun. 11, 1998, all of which are hereby incorporated by reference herein in their entireties.

BACKGROUND OF THE INVENTION

This invention relates to interactive television program guides, and more particularly, to interactive television program guides with program series reminder and recording capabilities.

Cable, satellite, and broadcast television systems provide viewers with a large number of television channels. Viewers have traditionally consulted printed television program schedules to determine the programs being broadcast at a particular time. More recently, interactive television program guides have been developed that allow television program information to be displayed on a viewer's television.

Interactive program guides are typically implemented on set-top boxes. Such program guides allow users to view television program listings in different display formats. For example, a user may instruct the program guide to display a grid or table of program listings organized in a channel-ordered or a time-ordered list. Users may also search and sort program listings by genre (e.g., movies, sports, etc.) or by title (i.e., alphabetically). A user may obtain additional information for a program by placing a highlight region on a desired program listing and pressing an "info" button.

Program guide data such as program listings, pay-per-view program purchasing information, promotional information, etc. is provided to users' set-top boxes with a data distribution system. Program guide data is typically stored in a central program guide database. Program guide data from the central database is transmitted to the headend facilities of various cable systems. Each headend distributes the program guide data to the set-top boxes in its system.

Some systems allow the user to set reminders to notify the user when certain television programs are to be aired. In such systems, when a user sets a reminder, the program guide will notify the user just prior to when the program is scheduled to be aired or automatically cause the system to tune to the program as it begins airing. However, if the user watches the same program each week and wishes to be notified with a reminder each time the program airs, a new reminder typically must be set by the user each time.

Some systems allow the user to select a program for recording by placing the highlight region on a program listing and pressing a "record" button. Moreover, the user may be able to schedule an upcoming program for recording. In such systems, when a user has scheduled a program to be recorded, the program guide may automatically cause the system to tune to the program as it begins airing, send a record command to a videocassette recorder to begin recording the program, and then stop the videocassette recorder from recording at the end of the program. The system may allow the user to record a program once, daily, weekly, or just weekdays. However, in order for the system to correctly record a program in a series each time it airs, the program must air at the same time and channel. If the program airs at a different channel or time, or if the user wishes to change the scheduled time or channel of recording, the programs in the series may not be recorded properly.

It is therefore an object of the present invention to provide an interactive television program guide system with program series reminder and recording capabilities.

SUMMARY OF THE INVENTION

This and other objects of the invention are accomplished in accordance with the principles of the present invention by providing an interactive television program guide with series reminder and series recording capabilities.

Program guide data is generally available in a data source of a main facility. The main facility provides data from the data source to multiple television distribution facilities via communications links. The data transmitted by the main facility to the television distribution facilities typically include at least television program listings data such as program times, channels, titles, ratings, categories, and descriptions. In addition, television program listings data may include information indicating whether the program is an episode of a program series and if the program is a new episode or a rerun.

Each television distribution facility distributes the television program listings data to multiple users via communications paths. Each user has user television equipment for displaying the television program listings information. The communications paths preferably have sufficient bandwidth to allow the television distribution facility to distribute multiple channels of television programming to the user television equipment.

The user television equipment that receives and processes the television program listings data from the television distribution facility may include a set-top box and a videocassette recorder. The set-top box may display television program listings on the user's display screen in the form of an interactive grid or list if desired. The user can interact with the television program guide by entering commands via a user input interface. An illustrative user input interface is an infrared remote control with arrow keys, a "guide" button, a "record" button, an "info" button, and various other keys.

When the user presses "guide," a grid or list is displayed that contains television program listings. For example, the program listings may be displayed in a grid format organized in channel order from top to bottom and by broadcast time from left to right. The user may scroll through the listings to locate programs at different times in the day or different days in the week using the arrow keys. The user can also position a highlight region on the desired entry by using the arrow keys.

If a user selects a program or pay-per-view event from the program listings, the user may set a reminder, which directs the system to generate a reminder message just before the scheduled broadcast time of the selected program to remind the user of the selected program. The user may schedule the program to be recorded on the videocassette recorder. The program guide may direct the set-top box to initiate recording of the program at the proper time. Recording a program in this way causes the set-top box to send a record command over a control path to the videocassette recorder.

When a user orders a reminder or schedules a recording, the system will determine if the selected program is an episode of a program series. If the selected program is not an episode of a series, the system will allow the user to order a reminder or schedule a recording for that single broadcast. If the selected program is an episode of a series, the program automatically presents the user with an opportunity to set a reminder or schedule a recording for that single episode or to set a reminder or schedule a recording for each episode of the series. In addition, other options may be provided that allow the user to determine, for example, whether to schedule reminders/recordings for episodes on all channels on which the program airs or only on the selected channel, whether to schedule reminders/recordings for all episodes including reruns or only new episodes, and whether to schedule reminders/recordings for episodes on all days or only on the selected day of the week. Moreover, other options may be provided that allow the user to schedule recordings for episodes that have not been recorded in the past or to set reminders for episodes that have not been viewed by the user in the past.

Before the scheduled broadcast time of each episode of each selected program series, the system sends a reminder message to the user that reminds the user of the program episode or sends a record command to the videocassette recorder or otherwise initiates recording of the episode.

The user may also view a list of all currently requested program reminders. Information such as the program name, type of program reminder, and the date and time the request was submitted may be displayed in the list for each reminder. The list may also indicate whether the entry represents a single program broadcast (a one-time reminder) or an episode of a program series. The list may also indicate whether or not the program is a rerun.

The user may view a list of all currently scheduled program recordings. Information such as the program name, the date and time the request was submitted, the date, time, channel, and length of the recording, and whether the scheduled entry represents a single program or an episode of a program series may be displayed for each entry.

Entries may be added to either the program reminder list or recording list as soon as the user makes a new request for either a reminder or recording. Moreover, if broadcast schedule information for any entry in either list is updated in the program listings, the system will automatically update the lists accordingly to match the new broadcast schedule information. This may prevent the user from missing a reminder or recording due to unexpected programming schedule changes. The user may also update or change any entry in either list manually using the remote control. In addition, the user may cancel any entry if the user no longer wishes to record or be reminded of an individual program, an episode of a series or the entire series. If the user selects a program from the program listings for which a reminder has already been set or a recording scheduled, the system will provide the user with an opportunity to edit or cancel entries from the reminder or recording lists.

If the user sets a reminder that conflicts with an existing reminder, the system may inform the user of the conflict. The system may issue multiple reminders. If desired, the user may be provided with an opportunity to resolve conflicts between reminders by allowing the user to select preferred reminders. However, systems having a single videocassette recorder used for recording and because a videocassette recorder can only record a single program at a time, scheduled recording conflicts should be resolved. Recording conflicts may be resolved in several ways. Recording conflicts may, for example, be resolved automatically by the system based on specified user preferences. The user may resolve conflicts directly as soon as the conflicts are detected. The system may allow the user to resolve any conflicts immediately or at a later, more convenient time. Alternatively, if the system provides for simultaneous recordings, the system may not inform the user of the conflict or provide the user with an opportunity to resolve the conflict.

Further features of the invention, its nature and various advantages will be more apparent from the accompanying drawings and the following detailed description.

BRIEF DESCRIPTION OF THE DRAWINGS

FIG. 7 is an illustrative reminder screen that allows the user to enter information for setting reminders in accordance with the present invention.

FIG. 8 is an illustrative information screen that allows the user to enter more information when setting reminders in accordance with the present invention.

FIG. 10 is a diagram of an illustrative reminder screen listing all current reminders in accordance with the present invention.

FIG. 10*a* is an illustrative reminder screen that allows the user to view, update, or cancel reminders in accordance with the present invention.

FIG. 12 is a diagram of an illustrative recording screen listing all currently scheduled recordings in accordance with the present invention.

FIG. 13 is a diagram of an illustrative reminder screen listing all current reminders and detected conflicts in accordance with the present invention.

FIG. 14 is a diagram of an illustrative recording screen listing all currently scheduled recordings and detected conflicts in accordance with the present invention.

DETAILED DESCRIPTION OF THE PREFERRED EMBODIMENTS

Figure 1:
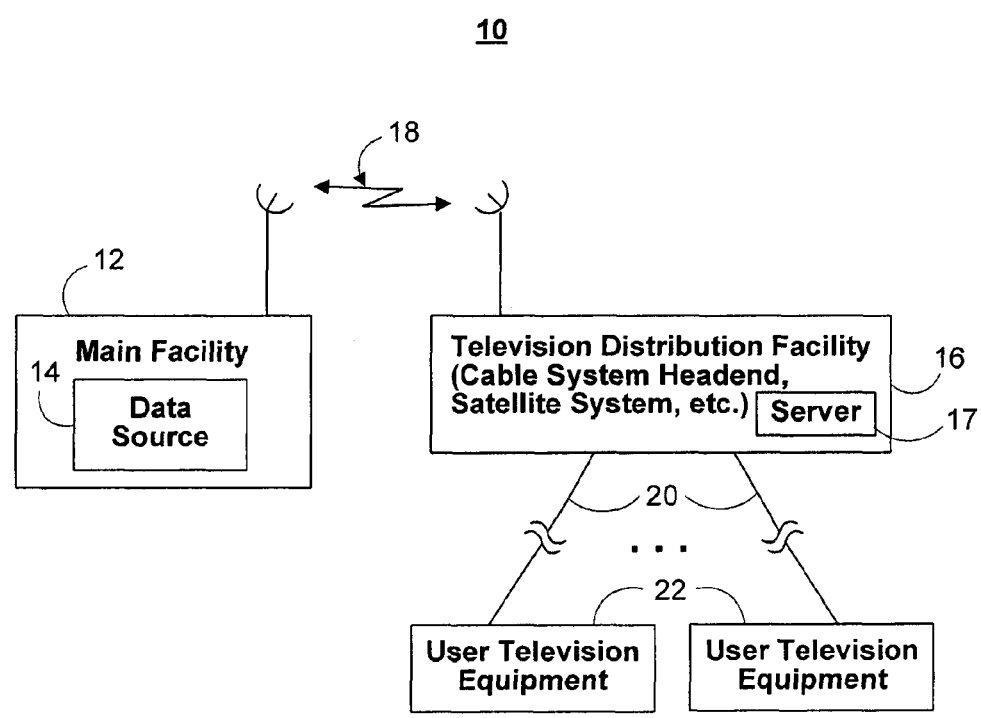
FIG. 1 is a schematic block diagram of an illustrative system in accordance with the present invention.

An illustrative system 10 in accordance with the present invention is shown in FIG. 1. Main facility 12 provides data from data source 14 to television distribution facility 16 via communications link 18. Link 18 may be a satellite link, a telephone network link, a cable or fiber optic link, a microwave link, a combination of such links, or any other suitable communications path. If it is desired to transmit video signals over link 18 in addition to data signals, a relatively high bandwidth link such as a satellite link may generally be preferable to a relatively low bandwidth link such as a telephone line. Television distribution facility 16 may be a cable system headend, a broadcast distribution facility, a satellite television distribution facility, or other such suitable data distribution facility.

Only one such television distribution facility 16 is shown in FIG. 1 to avoid overcomplicating the drawings. In general, however, main facility 12 distributes data to many such television distribution facilities in parallel. For clarity, the present invention will be described primarily in the context of a single television distribution facility 16.

The data transmitted by main facility 12 to television distribution facility 16 includes television program listings data (e.g., program times, channels, ratings, program categories, titles, and descriptions of individual programs, episodes of series, or entire series). In addition, television program listings data may include information indicating whether a given program is a single broadcast or an episode of a program series. The data may also include information whether a given program is a new first-run episode or is a rerun and whether a given program is a network or syndicated episode.

Television distribution facility 16 distributes the television program listings data to multiple users via communications paths 20. Each user has user television equipment 22 for displaying the television program listings information with an interactive television program guide implemented on user television equipment 22. Communications paths 20 preferably have sufficient bandwidth to allow television distribution facility 16 to distribute television programming to user television equipment. If desired, the television programming or data may be provided over separate communications paths.

Figure 2:
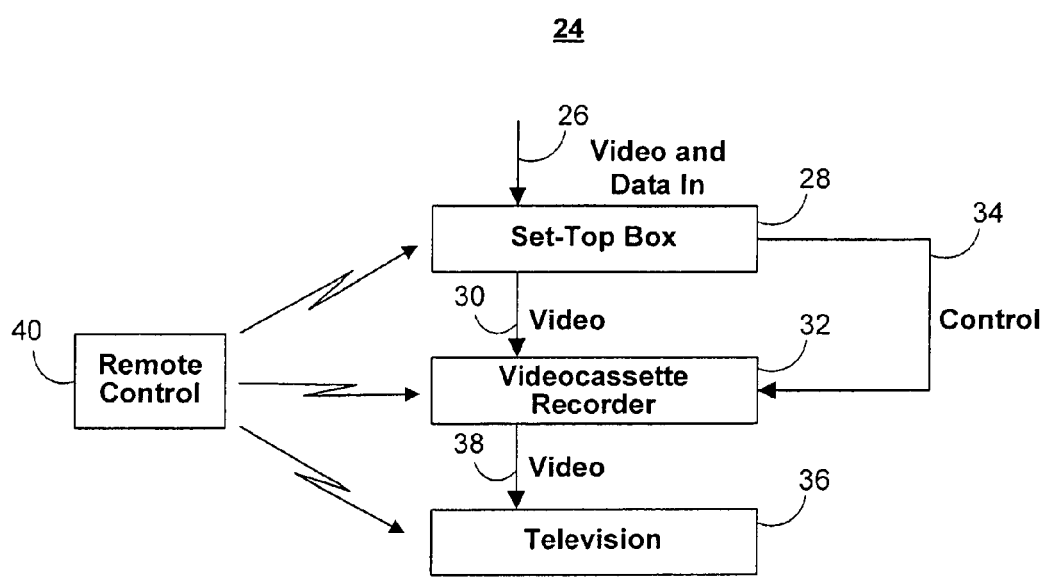
FIG. 2 is a schematic block diagram of illustrative user television equipment in accordance with the present invention.

An illustrative arrangement for user television equipment 22 is shown in FIG. 2. User television equipment 24 of FIG. 2 receives video and data from television distribution facility 16 (FIG. 1) at input 26. During normal television viewing, the user tunes set-top box 28 to a desired television channel. The signal for that television channel is then provided at video output 30 either as a radio-frequency (RF) signal on a predefined channel (e.g., channel 3 or 4) or as a demodulated video signal or digital signal. The video signal at output 30 may be received by videocassette recorder 32, so that the user may record programs. Program recording and other features may be controlled by set-top box 28 using control path 34. A typical control path 34 involves the use of an infrared transmitter coupled to the infrared receiver in videocassette recorder 32 that normally accepts commands from a remote control such as remote control 40. Remote control 40 may be used to control set-top box 28, videocassette recorder 32, and television 36.

Television 36 receives radio-frequency or demodulated video signals or digital signals from videocassette recorder 32 or set-top box 28 via communications path 38. The video signals on communications path 38 may either be generated by videocassette recorder 32 when playing back a prerecorded videocassette or may be passed through videocassette recorder 32 from set-top box 28. During normal television viewing, the video signals provided to television 36 correspond to the desired channel to which the user has tuned with set-top box 28. When the user wishes to view interactive television program guide information, the user may, for example, press a "guide" button on remote control 40 or view the information using other suitable technique. When set-top box 28 receives commands from remote control 40 that inform set-top box 28 that the guide button has been pressed, the interactive television program guide is invoked and processing circuitry within set-top box 28 displays various program guide display screens on television 36.

Figure 3:
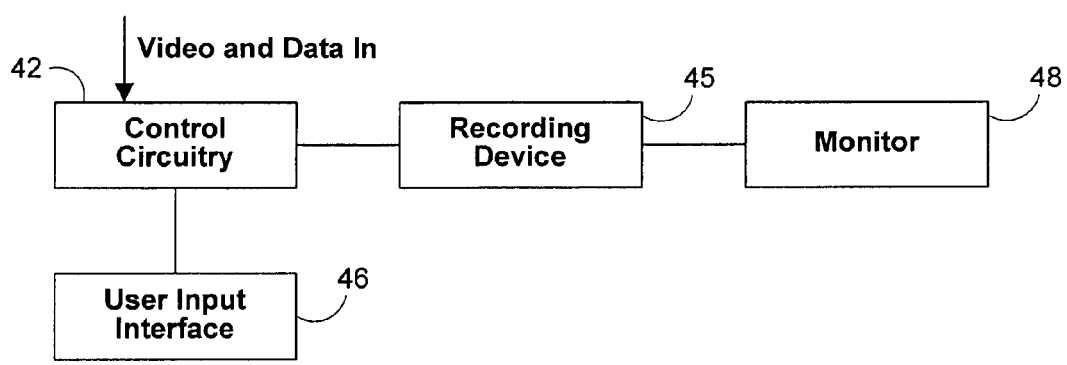
FIG. 3 is a generalized schematic block diagram of portions of the illustrative television equipment of FIG. 2.

A more generalized embodiment of the user television equipment of 24 FIG. 2 is shown in FIG. 3. As shown in FIG. 3, video and data signals from television distribution facility 16 (FIG. 1) are received by control circuitry 42 of user television equipment 44. Video signals are typically provided on multiple television channels. Data may be provided by transmission on a television channel sideband, in the vertical blanking interval of a television channel, as a digital data stream either in-band with programming or out-of-band, or by any other suitable analog or digital data transmission technique.

The user controls the operation of user television equipment 44 with user input interface 46. User input interface 46 may be a pointing device, wireless remote control, keyboard, touch pad, voice recognition system, or any other suitable user input device. To watch television, the user instructs control circuitry 42 to display a desired television channel on monitor 48 or any other suitable display device such as a computer monitor. To record a program, the user instructs control circuitry 42 to record a desired television program using recording device 45 or any other suitable recording device such as a recordable DVD or a hardisk. To view program guide information, the user instructs control circuitry 42 to display a program guide display screen on monitor 48.

The functions of control circuitry 42 may be provided using the set-top box arrangement of FIG. 2. Alternatively, these functions may be integrated into a television or videocassette recorder arrangement. These functions may also be provided by an advanced television receiver such as a high-definition television (HDTV) receiver, a personal computer television (PC/TV) or the like. If desired, a combination of such arrangements may be used.

If desired, an interactive television program guide may be implemented on system 10 using a client-server architecture. For example, a server at television distribution facility 16 (17 of FIG. 1) may operate in cooperation with user television equipment 22 which acts as a client. With this type of arrangement, some program guide functions (such as functions related to maintaining a program listings database) may be performed primarily at the server, whereas other functions (such as display and user input functions) may be performed primarily at user television equipment 22. Moreover, in such a client-server architecture implementation, some or all of the reminder and recording functions may be implemented on the server. Further features of an illustrative interactive television program guide implemented on a client-server architecture are described in Hassell et al. U.S. patent application Ser. No. 09/332,625, filed concurrently herewith, which is hereby incorporated by reference herein in its entirety. Further features of an illustrative interactive television program guide implemented on a client-server architecture where recordings are performed on the server are described in Ellis et al. U.S. patent application Ser. No. 09/332,244, filed concurrently herewith, which is hereby incorporated by reference herein in its entirety.

When a user indicates a desire to view television program guide information (e.g., by entering a command with user input interface 46), the program guide directs control circuitry 42 to generate a video image of a program guide display screen. The information for the program guide display screen may be contained in the data provided to the program guide from data source 14 (FIG. 1) in main facility 12 (FIG. 1). This data typically contains several days worth of program listings information for the program guide.

Figure 4:
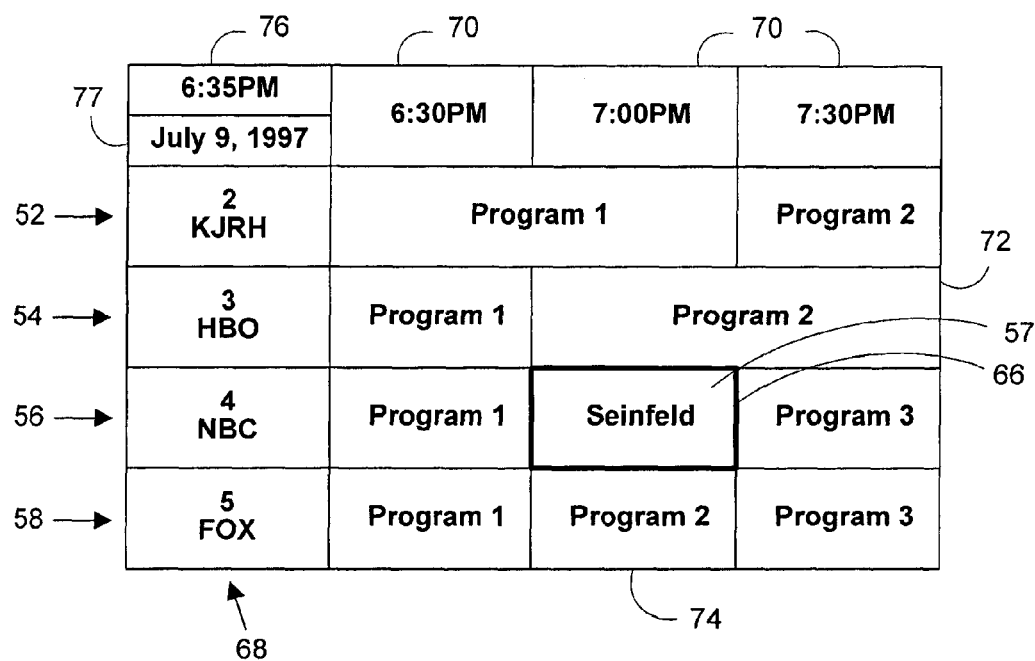
FIGS. 4 and 5 are illustrative program guide display screens in accordance with the present invention.

An illustrative program listings grid 50 that may be displayed by the program guide is shown in FIG. 4. Program listings grid 50 has program listings rows 52, 54, 56, and 58. Program listings row 52 contains program listings for programs 1 and 2 on channel 2 (KJRH) during the time slots 6:30 PM, 7:00 PM, and 7:30 PM. Program listings row 54 contains program listings for programs 1 and 2 on channel 3 (HBO), etc.

Program listings grid 50 (like other program guide screens displayed by the program guide) may have a highlight region 66. Highlight region 66 may be used to highlight the current grid cell (e.g., the grid cell for the program SEIN-FELD in the example of FIG. 4). The range of movement of highlight region 66 is typically bounded by column 68 on the left, by program listings time cells 70 on the top, by screen boundary 72 on the right, and by lower screen boundary 74 on the bottom. Time cell 76 may be used to display the current time and date cell 77 may be used to display the current date.

Figure 5:
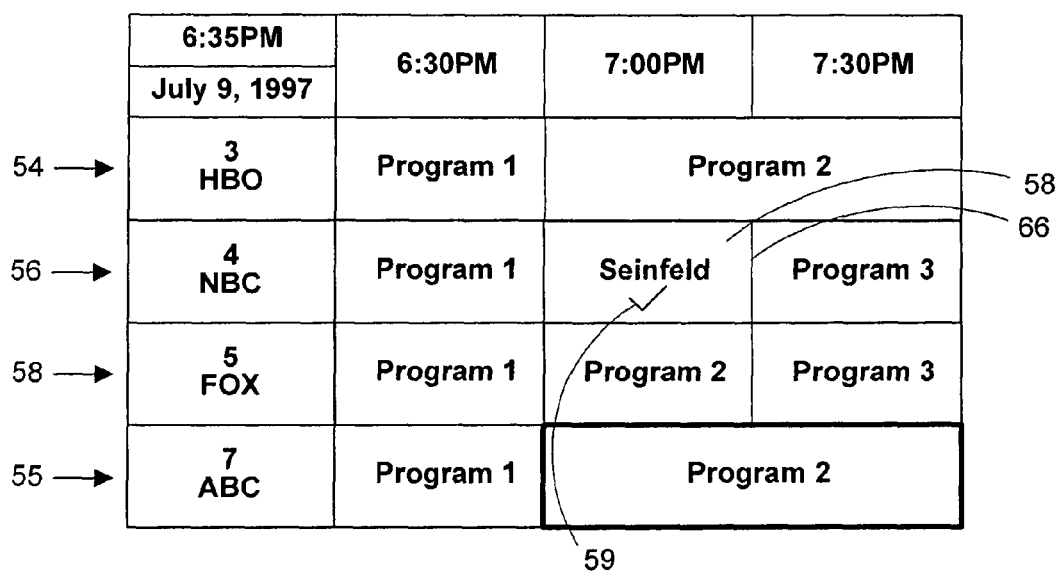

The user may position highlight region 66 by entering appropriate commands with user input interface 46. For example, if user input interface 46 is a remote control such as remote control 40 of FIG. 2, the user can position highlight region 66 using arrow keys. As shown in FIG. 5, if the user repeatedly moves highlight region 66 until it reaches lower screen boundary 74, further attempts at downward movement cause the program listings to scroll in the vertical direction. In the illustrative example of FIG. 5, program listings rows 54, 56, and 58 have been moved up one position in the grid. A new program listings row 55 is displayed at the bottom of grid 50. Vertical movement of highlight region 66 in the upward direction may be used to scroll the program listings in the opposite direction.

Similarly, when highlight region 66 is panned in the horizontal direction (i.e., moved to the right or left), the listings move accordingly (i.e., to the left or right respectively). Program listings grid 50 is but one illustrative program guide screen that may be displayed by the program guide on user television equipment 22. Other program guide screens that the program guide may provide include menu screens, lists or tables of program listings, screens in which products are advertised, screens in which the current television channel is overlayed with a browse or flip region containing a program listing, television program screens without an overlay, etc. Any of these program screens and any suitable program guide features may be provided by the program guide. Moreover, any or all of the features described may apply equally to any of the display formats described.

In a program guide display screen such as program listings grid 50, each program grid cell may contain descriptive information about a program, such as the program title, program rating, and a brief description. If the user wishes to set a reminder or schedule a recording for a program, the user may position highlight region 66 on the appropriate program listing. Once the user positions highlight region 66 on a particular program listing, the user may elect to set a reminder or schedule a recording for the program by pressing an "enter" button on remote control 40. If the "enter" button on remote control 40 is pressed, the user may be presented with a remind/record screen such as remind/record screen 70 of FIG. 6.

Remind/record screen 70 may present the user with the program title as well as the date and time the program is scheduled to air. Other components of remind/record screen 70 may be reminder option 85, record option 86, view current reminders option 87, view current recordings option 88, and cancel option 89. These options may be displayed on remind/record screen 70 whenever the user selects a program or event from program grid 50 (FIGS. 4 and 5) or from any other suitable guide screen.

Figure 6:
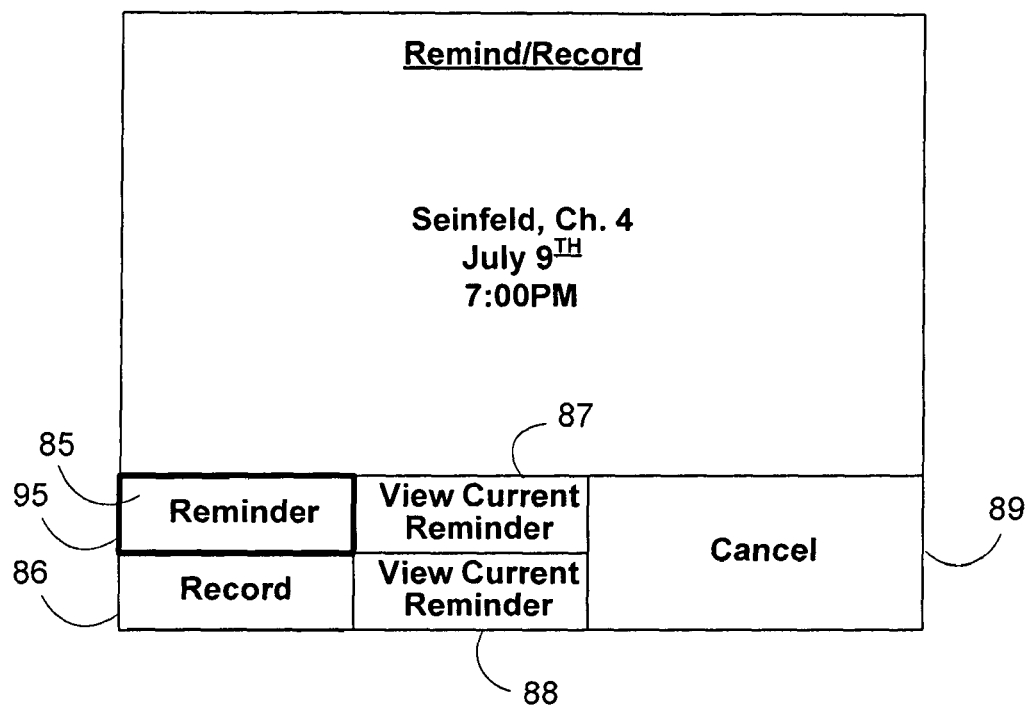
FIG. 6 is an illustrative detailed remind/record display screen in accordance with the present invention.

If the user wishes to set a reminder to remind the user when a given program is to be broadcast, the user may position highlight region 95 of FIG. 6 onto reminder option 85 and press an "enter" button (or other similar button) on remote control 40. Alternatively, the user may position highlight region 66 on top of a desired future program listing in grid 50 (FIGS. 4 and 5) or other guide listing screen and may press "enter" (or other similar button).

Once the "enter" button on remote control 40 has been pressed, the user may be presented with a program reminder screen such as program reminder screen 90 of FIG. 7. The program reminder screen may be a full screen as shown in FIG. 7, or may use a partial screen overlay or other suitable arrangement if desired. Program reminder screen 90 contains various user-selectable options that the user may complete when setting reminder messages to remind the user when selected television programming is to be broadcast. As defined herein, such uses of the term "broadcast" refer to the process of airing television programs by traditional television broadcast techniques, cable systems, satellite systems, microwave systems, etc.

Program reminder screen 90 may provide several user-selectable options that specify when and how often the user will be reminded of the airing of selected television programs or program series. As defined herein, such uses of the term "series" refer to any set of related programs such as a program series, mini-series, sports series, pay-per-view package, etc. If the selected program is an episode of a program series, for example, program reminder screen 90 may contain episode/series reminder option 92. Episode/series reminder option 92 allows the user to either order a reminder for the currently selected episode of the program or order reminders for all episodes in the entire series. For example, if the user wishes to order a series reminder, the user may position highlight region 95 of FIG. 7 onto the "Entire Series" selection of episode/series reminder option 92 and press an "enter" button on remote control 40. Selecting the "Entire Series" option allows the user to order and receive reminder messages for each episode of the program series. If the series a mini series, reminders will end after the last episode of the series. If the series is an ongoing series, reminders will continue to be displayed for the series until cancelled by the user. If the user chooses the "This episode" selection, the user may receive a reminder message for only the currently selected episode. If the selected program is a single broadcast and not an episode of a program series, the program guide will not allow the user to make a selection using episode/series reminder option 92.

In addition to episode/series reminder option 92, program reminder screen 90 may contain other user-selectable reminder options that specify when and how often the user will be reminded of the airing of the selected television program or episode. For example, program reminder screen 90 may also contain how soon option 93. How soon option 93 allows the user to indicate how soon before the broadcast of the scheduled program or episode reminder messages are to be generated and displayed to the user. As shown in FIG. 7, how soon option 93 may contain an option that allows the user to be reminded from 1 to 15 minutes (in one minute increments) or another amount of time before the selected program is broadcast. The user may make entries into how soon option 93 using remote control arrow keys to increase or decrease the desired value of minutes, or by using remote control number keys to enter desired numerical values for the item, or by using any other suitable user interface. If "other" is selected in how soon option 93, the user is presented with screen 110 of FIG. 8, which allows the user to be reminded 1 hour, 1 day, 2 days, or to specify a desired lead time before a scheduled event by completing option 115. The user may make entries into screen 110 using remote control arrow keys to increase or decrease the desired values of days, hours, and minutes, or by using remote control number keys to enter desired numerical values for these items, or by using any other suitable user interface.

Upon completing screen 110 of FIG. 8, the user may submit the information that has been entered by selecting option 117. The user may exit page 110 without submitting the information by selecting exit option 119. If the user selects either enter option 117 or exit option 119, the user is returned to program reminder screen 90.

Alternatively, information such as how soon before the broadcast of the scheduled program or episode reminder messages are to be generated and displayed to the user may be a global default or global setting. For example, such information may be specified by the user in a set-up screen.

Program reminder screen 90 of FIG. 7 may also contain program channel option 104. Option 104 allows the user to specify which channel or channels program reminders are to be scheduled for. Option 104 may contain selections that allow the user to be reminded of program episodes airing on the selected channel, on all channels on which the program airs, or on certain channels the program is scheduled to air on. Typically, if the user selects the "Selected Channels" option, the user may be allowed to specify certain channel or channels program reminders are to be scheduled for.

Program reminder screen 90 of FIG. 7 may also contain program day option 107. Option 107 allows the user to specify on which days of the week program reminders are to be scheduled for. Option 107 may contain selections that allow the user to be reminded of program episodes airing on the currently selected day of the week, on all days of the week, or on certain days of the week the program episode is scheduled to air on. Typically, if the user selects the "Selected Days" option, the user may be allowed to specify certain day or days program reminders are to be scheduled for.

Program reminder screen 90 of FIG. 7 may also contain program type option 108. Option 108 allows the user to specify which type of program episodes (assuming the selected program is an episode of a program series) program reminders are to be scheduled for. For example, as shown in FIG. 7, option 108 may contain selections that allow the user to set reminders for new (i.e., first-run) episodes, rerun episodes, network episodes, syndicated episodes, only previously unviewed episodes, or all scheduled episodes whether first-run, rerun, network, syndicated, or previously unviewed.

Typically, episode/series reminder option 92, program channel option 104, program day option 107, and program type option 108 may only be selectable by the user when the program selected from the guide is an episode of a program series. How soon option 93 may be selectable by the user regardless of whether or not the program is an episode of a program series. If the selected program is not an episode of a program series but rather is a single broadcast event, the user may set a reminder for that single broadcast and be allowed to make a selection from how soon option 93. Similarly, if the selected program is a program series and the user wishes to set a reminder for a single episode, the user may set a reminder for that single episode and be allowed to make a selection from how soon option 93.

At any time during the completion of program reminder screen 90 (FIG. 7), the user may cancel the reminder by selecting cancel option 97. Selecting cancel option 97 returns the user to display 70 of FIG. 6 or other previous screen. The user may also deselect any previously selected option by positioning highlight region 95 on the selected option and pressing the "enter" button on remote control 40.

Upon completing program reminder screen 90, the user may set the reminder by selecting OK option 94. Selecting OK option 94 directs the program guide to process the reminder. Set-top box 28 (FIG. 2) processes and stores each reminder set by the user. The system initially searches the existing database for all programs and episodes matching the criteria specified by the user. The system will then set a reminder for each matching program or episode. Moreover, if any existing information has changed or has been updated or if any new information has been added, the system will again examine the user criteria and set a reminder (or update or remove an existing reminder) for each new or updated program or episode. The reminders are then generated by set-top box 28 and displayed on television 36 of FIG. 2 at the appropriate time. Depending on the type of television program (i.e., a series or non-series program) and the user-selectable options selected, the user may request and receive one or more reminders.

Figure 9:
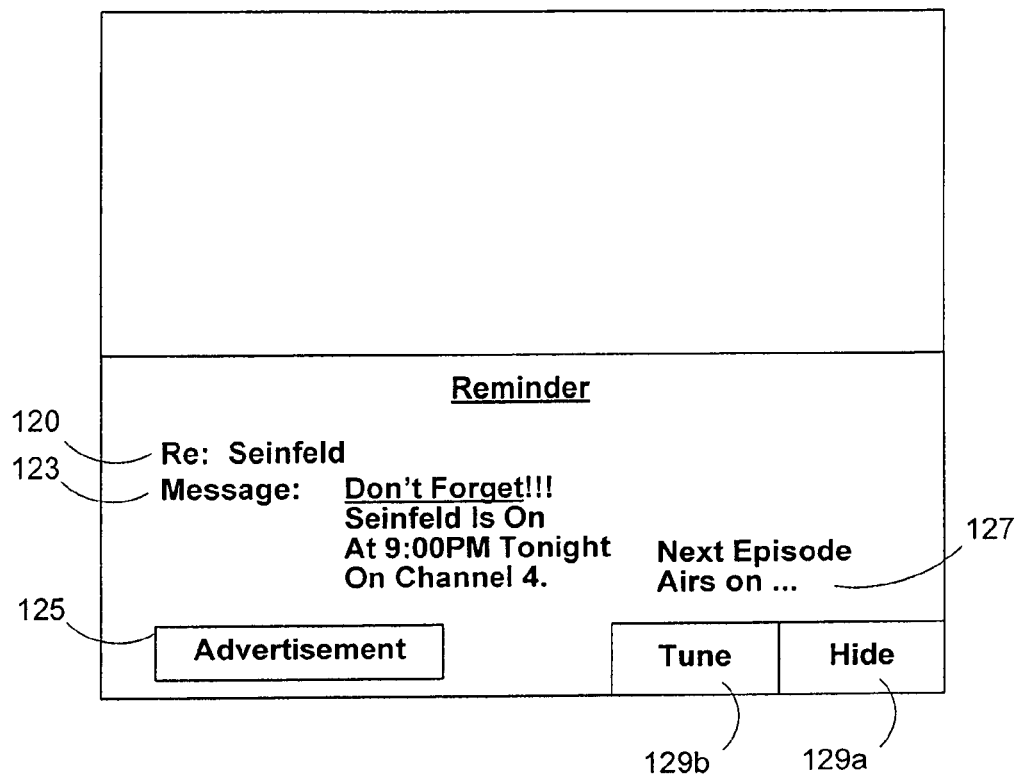
FIG. 9 is a diagram of an illustrative reminder displayed on the user's television screen in accordance with the present invention.

A typical series program reminder is shown in FIG. 9. The reminder is typically presented as a partial-screen overlay on top of the current television program being viewed by the user. The reminder may contain the name of the television program that the user is being reminded of (120), a reminder message indicating "DON'T FORGET," and information on when the television program is to broadcast (123). If the program is an episode of a program series, the reminder may also contain information on when the next episode is to broadcast (127). The user may hide the reminder by selecting hide option 129*a*. The user may immediately tune to the channel that is scheduled to show the desired program by selecting tune option 129*b*. An advertisement 125 (text, graphics, etc.) may be included in the reminder if desired. The advertisement may be provided using information stored in main facility 12 and transmitted to user television equipment 22 with the program guide data.

Moreover, the program reminder may also list all other currently active program reminders. For example, if the user receives a program reminder such as the program reminder shown in FIG. 9, the reminder may list the program that is currently scheduled to air for which the user has received the reminder, as well as the reminder for the current television program being viewed by the user (assuming the user set a reminder for that program in the past). The list may also include any other reminders the user has set and recently received. The program reminder for the program scheduled to air next will preferably be listed first however the user may specify any other reminder order based on user preferences. The user may select any reminder from the list and may immediately tune to the channel that is showing or will show the program.

Another aspect of the invention relates to managing one's reminders. If desired, program reminder screen 90 of FIG. 7 may contain view current reminders option 98. If view current reminders option 98 is selected, (or if desired when the user selects OK option 94 of program reminder screen 90), the user may be presented with current reminders screen 130 of FIG. 10. The user may also access current reminders screen 130 by selecting view current reminders option 87 of FIG. 6 or from any other guide screen such as a menu screen. Current reminders screen 130 contains a list of all the user's currently requested reminders. Information such as program name, program episode (i.e., whether a single broadcast or an episode of a program series), type of reminder, and the date and time the request was submitted may be displayed. Typically, the entries in current reminders screen 130 are listed in chronological order based on when they are to be presented to the user. The reminder for the episode scheduled to air next will preferably be listed first however the user may specify any other reminder order based on user preferences.

For example, a current reminder entry for the program "SEINFELD" (135) may be displayed as shown in FIG. 10. The user requested a reminder for only the selected episode of the program (i.e., not the entire series), a rerun episode, airing on July 9th on CH. 4 at 7:00 PM. This reminder was submitted on Jul. 5, 1997 at 3:04 PM and is set to remind the user one hour before the broadcast of the episode. This entry is listed first and is the first scheduled program to air.

In addition, if the user requests reminders for an entire series, that information may be displayed as well. Current reminders screen 130 may display each episode of the series scheduled to air. For example, as shown in FIG. 10, a current reminder entry for the program "THIS WEEK WITH SAM AND COKIE" (134) is displayed showing that a series reminder has been requested (133). The user will receive reminders for all scheduled episodes of the series, one day before the broadcast of each episode of the series. The next entry in the list and the next program scheduled to air is the July 10th episode of the series and is the next reminder to be presented to the user.

The user also requested a reminder for another episode of the "SEINFELD" series airing on July 14th on CH. 11 at 11:00 PM. This episode is listed next because that episode will air after the first listed episode of the series "THIS WEEK WITH SAM AND COKIE" but before the next listed episode of the series. Finally, as shown in FIG. 10, the remaining episodes of the series "THIS WEEK WITH SAM AND COKIE" are listed and the user will receive a reminder for each scheduled episode of the series. The user may select arrow icon 132 or any other suitable icon to display and scroll through the remaining episodes of the series.

Entries may be added to the current reminders list as soon as the user sets each reminder (e.g., by selecting OK option 94 from program reminder screen 90 of FIG. 7). Moreover, entries may be added to the current reminders list when the program guide automatically determines that newly scheduled program guide events match the reminder options for an existing program reminder listing. This may occur, for example, if newly added episodes are broadcast after the user has set reminders for a related series. In addition, if a schedule change is received' by the program guide for any currently set reminder, the current reminder list will be updated to match the new schedule. This may prevent the user from missing a scheduled reminder due to unexpected programming schedule changes.

Moreover, the system may list series reminders set by the user even if there are no current episodes in the guide's database matching the criteria specified by the user. In addition to reminding the user the series reminder has been set, it allows the user to cancel the reminder if the user no longer wishes to be reminded of the broadcasts of that series. These reminders will preferably be located at the bottom of the list.

The user may also view and manage current reminders from elsewhere in the guide. For example, the user may select a manage reminder option from a program guide menu screen. Selecting the option may also present the user with a current reminders listing.

In addition, the user may update or delete any currently set reminder from any program guide grid or other guide listing screen or from the current reminders listing screen. The program grid entry may, for example, indicate to the user that a reminder has been set for the program or series and allow the user to update or delete the reminder by selecting the program entry from the grid. For example, as shown in program grid 50 of FIG. 5, if a reminder is currently set for the program series "SEINFELD" (58), the grid may reflect that information by displaying a "check" mark (59) or other suitable identifying mark within the program listing entry. If the user wishes to update or delete the reminder currently set for that program series, the user may position highlight region 66 on that program listing and press an "enter" button on remote control 40. If the "enter" button on remote control 40 is pressed, the user may be presented with a program reminder update screen such as program reminder update screen 135 of FIG. 10*a*.

Program reminder update screen 135 of FIG. 10*a* may display the same user-selectable options and selections the user specified when ordering the reminder from program reminder screen 90 of FIG. 7. The user may update any option by positioning highlight region 95 onto the desired selection within the option and pressing the "enter" button on remote control 40. If the selected program is an episode of a program series, program reminder update screen 135 may contain update reminder option 132. Update reminder option 132 allows the user to either update the reminder for the currently selected episode of the series or update reminders for all episodes in the entire series. Similarly, if the selected program is not an episode of a program series but rather is a single broadcast event, the user may update the reminder for that single broadcast by updating the how soon option which may be the only option selectable by the user. Upon completing program reminder update screen 135, the user may set the updated reminder by selecting OK option 121. After selecting OK option 121, current reminders screen 130 is updated with the new information.

If the user wishes to cancel a current series reminder, the user may position highlight region 95 onto cancel series reminder option 124 and press enter. If the user wishes to cancel a current episode reminder, the user may position highlight region 95 onto cancel current episode reminder option 112 and press enter. Similarly, if the selected program is not an episode of a program series but rather is a single broadcast event, the user may select an option to cancel the reminder for that single broadcast. Upon selecting any cancel option, the cancelled reminder or reminders for the program, episode, or series is/are deleted from the current reminders list (130) and the user will no longer be reminded of the broadcast or broadcasts of that program or series. The user may return to program grid 50 or any other previous screen by selecting exit option 111.

Current reminders screen 130 may also indicate whether there are any conflicting reminders. Conflicting reminders screen 130 may inform the user that two or more programs or series episodes that the user has requested reminders for are scheduled to air simultaneously (i.e., on the same day and time, partially or entirely). If the system is configured to maintain simultaneous conflicting reminders, current reminders screen 130 may not indicate to the user that there are conflicting reminders. However, displaying conflicting reminders may be preferred. For example, rather than the user receiving a reminder message such as the reminder message shown in FIG. 9, the system may instead tune to the channel showing the program when the program is scheduled to air. For example, the system may be configured to automatically tune to a program when a reminder for that program has been received (i.e., an automatically tuning reminder). In a system configured to provide automatically tuning reminders, the user or the system would need to resolve any conflicts.

As shown in current reminders screen 180 of FIG. 13, for example, the user has requested reminders for programs X, Y, and Z. Programs X and Z are single broadcasts while program Y is a program series. As shown in the "EPISODES" column (181) of FIG. 13, an episode of program Y is scheduled to air on the same day and time (i.e., May 3, 1997 at 8:00 PM) as program X. Accordingly, current reminders screen 180 displays a conflicting reminders message such as conflicting reminders message 183 (i.e., "CONFLICT") of FIG. 13. Program conflicts may also be displayed using other suitable techniques, such as displaying the conflicting program listings with a unique color or icon.

The user may decide to resolve the conflict before the programs are scheduled to air by cancelling one of the conflicting reminders (described below). Alternatively, the user may decide to maintain all the scheduled reminders and choose among the conflicting programs when the programs are scheduled to air. Moreover, in systems configured to provide automatically tuning reminders, the guide may resolve conflicts based on system defaults or previously specified user settings.

If the user wishes to cancel a current reminder that the user has previously set, the user may highlight the desired entry on current reminders screen 130 with highlight region 131 (as shown in FIG. 10) and press "enter" on remote control 40. If the "enter" button on remote control 40 is pressed, the user may be presented with a program reminder update screen such as program reminder update screen 135 of FIG. 10a. Once presented with program reminder update screen 135, the user may cancel a single program broadcast, a program episode, or an entire program series by selecting the appropriate option. Moreover, the user may resolve the conflict by updating a reminder using program reminder update screen 135. For example, the user may update the program channels option to resolve the conflict. If the user wishes to cancel the series reminder set for the entire series of "THIS WEEK WITH SAM AND COKIE" shown in FIG. 10, the user may position highlight region 131 on that entry under the "PROGRAM" column and press enter. After pressing enter, the user may be presented with program reminder update screen 135 from which the user may select cancel series reminder option 124. After selecting cancel option 124, the highlighted series is deleted from current reminders list 130 and the user will no longer be reminded of the broadcasts of that series. The user may return to current reminders screen 130 or any program guide menu screen by selecting exit option 139.

Another aspect of the invention relates to scheduling a program episode or program series to be recorded. If the user wishes to record a program episode or series, the user may position highlight region 95 of FIG. 6 onto record option 86 and press an enter or other similar button on remote control 40 or may press a record button on remote control 40 to record the program. If the enter button on remote control 40 is pressed, the user may be presented with a program record screen such as program record screen 140 of FIG. 11. Program record screen 140, contains various user-selectable options the user may complete when scheduling program recordings. For example, program record screen 140 may contain episode/series record option 142. Making a selection in episode/series record option 142 allows the user (if the selected program is a program series) to either schedule a recording for the currently selected episode of the program or schedule recordings for all episodes in the entire series. For example, episode/series record option 142 may allow the user the schedule recordings for an entire program series by positioning highlight region 95 and selecting the "Entire Series" option. If the user instead selects the "This episode" option, the user may schedule a recording for only the currently selected episode. If the selected program is a single broadcast and not an episode of a program series, the user may not select an option in episode/series record option 142.

In addition to episode/series record option 142, program record screen 140 may also contain other user-selectable record options, provided that the selected program is a program series and the user has selected to record the entire series. These record options allow the user to specify which episodes of the program series the user wishes to record. For example, program record screen 140 may contain program channel option 145, program day option 146, and program type option 147. However, these record options may not be selectable by the user if the selected program is a single broadcast event or if the selected program is a program series and the user wishes to schedule a recording for a single episode of the series. At any time during completion of program record screen 140, the user may cancel the record order by selecting cancel option 148. Selecting cancel option 148 returns the user to display 70 of FIG. 6 or another previous screen. The user may also access program reminder screen 90 of FIG. 10 by selecting reminders option 149. Moreover, the user may deselect any previously selected option by positioning highlight region 95 on the selected option and pressing the enter button on remote control 40.

Figure 11:
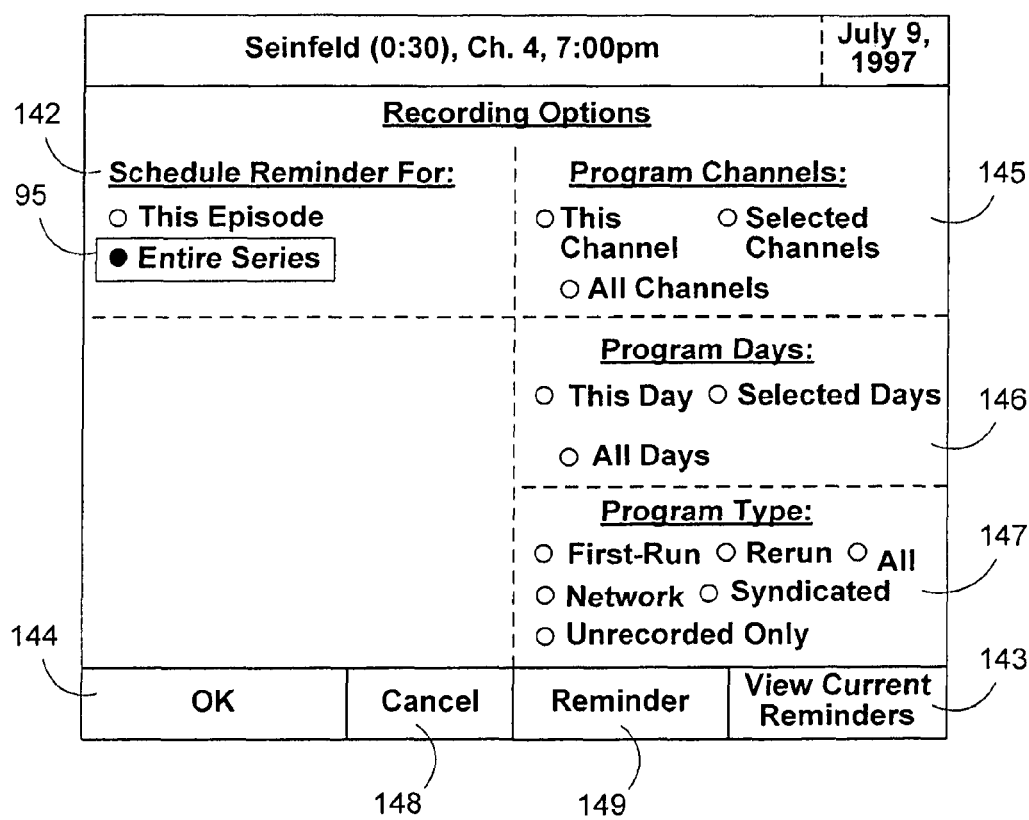
FIG. 11 is an illustrative recording screen that allows the user to enter information for scheduling recordings in accordance with the present invention.

In another aspect of the invention, the information displayed in program reminder screen 90 of FIG. 7 and program record screen 140 of FIG. 11 may be displayed on the same program guide screen.

Upon completing program record screen 140, the user may submit a record order for processing by selecting OK option 144. Selecting OK option 144 directs the program guide to process the request. Set-top box 28 may contain control circuitry to process and store each request submitted by the user. In a client-server architecture implementation, the processing and storing of requests may be performed at the server. The system initially searches the existing database for all programs and episodes matching the criteria specified by the user. The system will then schedule a recording for each matching program or episode. Moreover, if any existing information has changed or has been updated or if any new information has been added, the system will again examine the user criteria and schedule a recording (or update or delete an existing recording) for each new or updated program or episode. Set-top box 28 of FIG. 2 will send recording control signals to videocassette recorder 32 via line 30 to direct videocassette recorder 32 to initiate recording of the program or series episode at the proper recording time.

Another aspect of the invention relates to managing one's scheduled recordings. If desired, program record screen 140 of FIG. 11 may contain view current recordings option 143. If view current recordings option 143 is selected, the user may be presented with current recordings screen 170 of FIG. 12. Moreover, the guide may also present current recordings screen 170 when the user selects OK button 144 of program record screen 140. Current recordings screen 170, similar to current reminders screen 130 of FIG. 10, may contain a list of all the user's currently scheduled recordings. Information such as program name, program episodes, and the date and time the request was submitted may be displayed. Current recordings screen 170 may also indicate whether the user has scheduled a recording for a single broadcast or a program series.

Entries may be added to the current recordings list as soon as the user submits each request (e.g., by selecting submit button 144 from program record screen 140 of FIG. 11). Moreover, entries may be added to the current recordings list when newly scheduled program guide events match the record options for any existing program record listing. In addition, if a schedule change is received by the program guide for any currently scheduled recording, the current recordings list will be updated to match the new schedule. This may prevent the user from missing a scheduled recording due to unexpected programming schedule changes.

Moreover, the system may list series recordings set by the user even if there are no current episodes in the guide's database matching the criteria specified by the user. In addition to reminding the user the series recording has been set, it allows the user to cancel the recording if desired. These recordings will preferably be located at the bottom of the list.

The user may also view and manage currently scheduled recordings from elsewhere in the guide. For example, the user may select a manage recording option from a program guide menu screen. Selecting the option may also present the user with a current recordings listing.

In addition, similar to currently set reminders (as described earlier), the user may update or delete any currently scheduled recording from any program guide grid or other guide listing screen or from current recordings listing 170. The program grid entry may, for example, indicate to the user that a recording has been scheduled for the program or series and allow the user to update or delete the recording by selecting the program entry from the grid. For example, as shown in program grid 50 of FIG. 5, if a recording is currently scheduled for the program series "SEINFELD" (58), the grid may reflect that information by displaying a "check" mark (59) or other suitable identifying mark within the program listing entry (preferably a different identifying mark than one used to identify currently set reminders). If the user wishes to update or delete the recording currently scheduled for that program series, the user may position highlight region 66 on that program listing and press an "enter" button on remote control 40. If the "enter" button (or other suitable key) on remote control 40 is pressed, the user may be presented with a program recording update screen such as program recording update screen 175 of FIG. 12a.

Figure 12A:
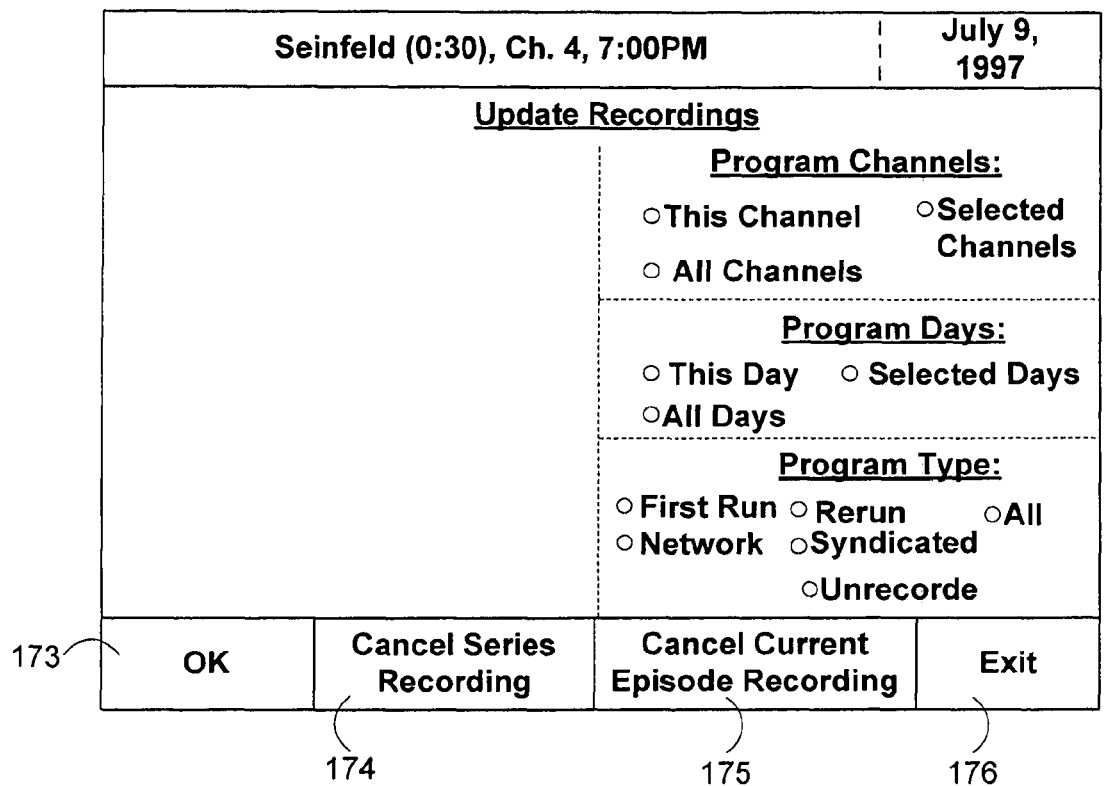
FIG. 12*a* is an illustrative recording screen that allows the user to view, update, or cancel recordings in accordance with the present invention.

Program recording update screen 175 of FIG. 12a, similar to program reminder update screen 135, may display the same user-selectable options and selections the user specified when scheduling the recording from program record screen 140 of FIG. 11. The user may update any option by positioning highlight region 95 onto the desired selection within the option and pressing the "enter" button on remote control 40. Upon completing program recording update screen 175, the user may schedule the updated recording by selecting OK option 173. After selecting OK option 173, current recordings screen 170 is updated with the new information.

If the user wishes to cancel a current series recording, the user may position highlight region 95 onto cancel series recording option 174 and press enter. If the user wishes to cancel a current episode recording, the user may position highlight region 95 onto cancel current episode recording option 175 and press enter. Similarly, if the selected program is not an episode of a program series but rather is a single broadcast event, the user may select an option to cancel the recording for that single broadcast. After selecting any cancel option, the cancelled program, episode, or series is deleted from the current recordings list (170) and the user will no longer record that program or series. The user may return to program grid 50 or another previous screen by selecting exit option 176.

Similarly, if the user wishes to cancel a currently scheduled recording that the user has previously ordered from the current recordings list 170 of FIG. 12, the user may highlight the desired entry on current recordings screen 170 with highlight region 171 (as shown in FIG. 12) and press a remote control enter key. If the enter button on the remote control is pressed, the user may again be presented with program recording update screen 175 of FIG. 12a. The user may, as described above, cancel or update a single program broadcast, a program episode, or an entire series from current recordings screen 170. The user may return to current recordings screen 170 by selecting exit option 176.

The user may also access current reminders screen 130 of FIG. 10 by selecting view current reminders option 177 from current recordings screen 170. Moreover, the user may also arrive at current recordings screen 170 by selecting view current recordings option 88 of program information screen 70 (FIG. 6).

Current recordings screen 170 may also indicate whether there are any conflicting recordings by displaying a conflicting recordings message similar to conflicting reminders message 183 of FIG. 13. If the system allows simultaneous recordings (such as the system described in Ellis et al. U.S. patent application Ser. No. 09/332,244, filed concurrently herewith), the system may not indicate or display any conflicts. However, in systems where user television equipment 24 of FIG. 2 contains a single videocassette recorder, the user must resolve the conflict because a single videocassette recorder cannot support multiple simultaneous recordings.

Preferably, the program guide allows the user to resolve conflicts as soon as conflicts are detected. For example, as shown in current recordings screen 190 of FIG. 14, the user has scheduled recordings for programs X, Y, and Z. Programs X and Z are single broadcasts while program Y is a program series. As shown in the "EPISODES" column (191) of FIG. 14, an episode of program Y is scheduled to air on the same day and at the same time (i.e., May 3, 1997 at 8:00 PM) as program X. Accordingly, current recordings screen 190 may display a conflicting recordings message such as conflicting recordings message 194 (i.e., "CONFLICT") of FIG. 14. Program conflicts may also be displayed using other suitable techniques, such as displaying the conflicting programs with a unique color or icon, etc. The user may be allowed to resolve the conflict by selecting resolve conflicts option 193 of FIG. 14. If the user selects resolve conflicts button 193, the user may be presented with resolve conflicts screen 210 of FIG. 15.

In another aspect of the invention, the user may be notified of a conflict and allowed to resolve the conflict from the same program guide screen.

Figure 15:
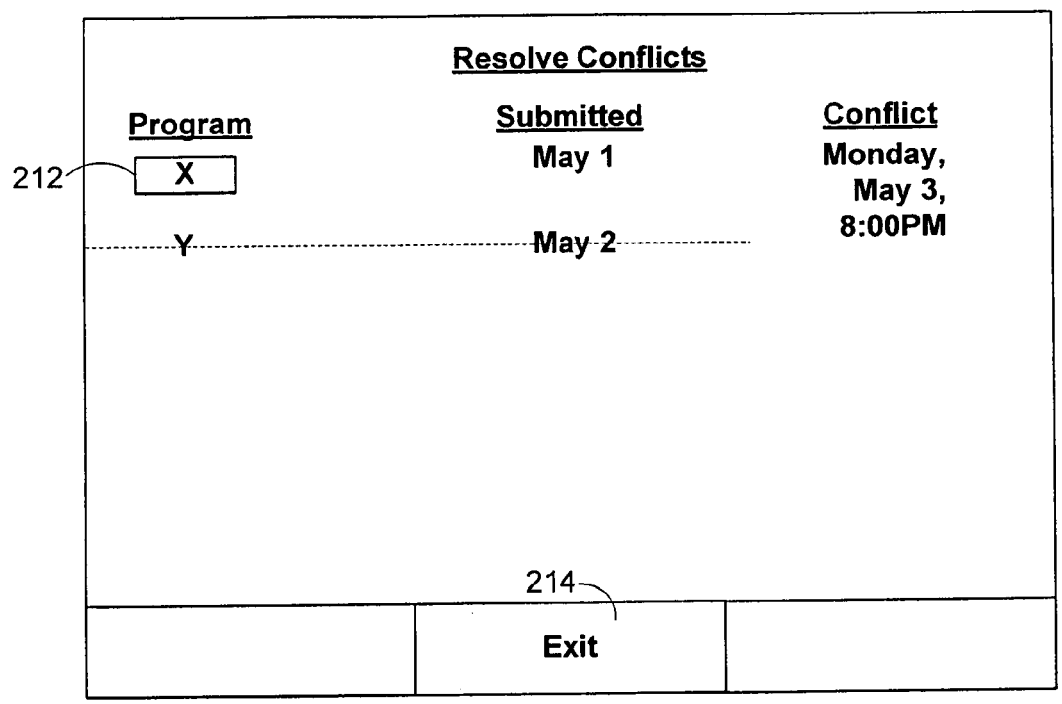
FIGS. 15 and 16 are illustrative recording screens that allow the user to resolve recording conflicts in accordance with the present invention.

As shown in FIG. 15, resolve conflicts screen 210 may display the program names, the date and time the recording request was submitted, and the date and time of the detected conflict. Resolve conflicts screen 210 may allow the user to choose which of the conflicting programs or episodes are to be recorded. For example, as shown in FIG. 15, conflicting programs X and Y are listed. Although program Y is a scheduled program series to be recorded, only the conflicting program episode is listed. Program X is listed first and assumed preferred by the user over program episode Y because its request was submitted most recently by the user. While the program listing order represents recording priority, the system may or may not record programs based on the program listing order. Resolve conflicts screen 210 may list conflicting programs based on other possible user designated criteria such as program start times, channel numbers, single episodes over series, etc., or may list conflicting programs based the system's own priority scheme. Accordingly, other scheduled programs or episodes in the list may, for example, have a line drawn through them to indicate they are not preferred by the user and that their scheduled recordings are to be deleted or updated. For example, as shown in FIG. 15, program episode Y has a line drawn through it and that scheduled recording may be deleted or updated if the program listing is selected. If the program listing is selected, the user may be presented with program recording update screen 175 of FIG. 12a. The user may, as described earlier, cancel the conflicting program, series episode, or series. The user may also, if desired, resolve the conflict by updating the conflicting recording from recording update screen 175. If the user deletes the entry for program episode Y, the user may not record that episode but the scheduled recording for all other episodes of that program series will remain. In addition, the user may do nothing whereby the guide will resolve the conflict based on system or user default settings (e.g., record program X).

Figure 16:
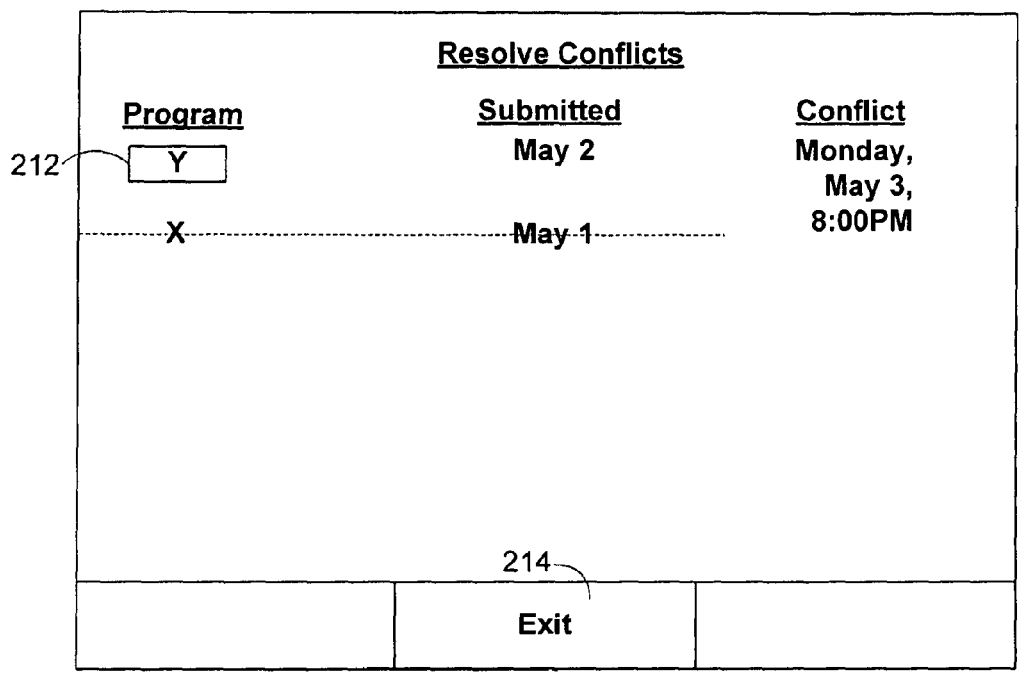

However, if the user would rather cancel or update the scheduled recording of program X and retain the scheduled recording of program episode Y, the user may position highlight region 212 on the program episode X entry and press the enter button on remote control 40. This allows the user to be presented with program recording update screen 175 for program episode X where the user may cancel or update the episode or series. This may cause program episode Y to be listed first and program X to be listed next with a line drawn through it indicating that that entry has been deleted or updated, as shown in FIG. 16. The user, once the conflict is resolved, may return to current recordings screen 190 or another previous screen by selecting exit option 214.

While the program guide allows the user to resolve conflicts as soon as conflicts are detected, a user may decide not to resolve a conflict once one is detected. Furthermore, the program guide may not detect a conflict immediately after the user submits a recording request to be processed, but may detect a conflict at a later time when the user may or may not be in the program guide. The latter situation may arise, for example, if new program information in the database is added or existing information is updated since the user last submitted a request.

The program guide may allow the user to resolve any future conflicts detected by the guide by notifying the user of the conflicts as soon as they are detected. The program guide may display a conflicting recordings message such as conflicting recordings message 194 of FIG. 14 or may display resolve conflicts screen 210 of FIG. 15. The user may resolve the conflict by selecting resolve conflicts option 193 of FIG. 14. If the user selects resolve conflicts button 193, the user may be presented with resolve conflicts screen 210 of FIG. 15 and allowed to resolve the conflict as discussed previously. If the user is not in the guide when a conflict is detected, the user may be presented with resolve conflicts screen 210 or any other suitable conflicting recordings message and allowed to resolve the conflict as soon as the user enters the guide or at any other time specified by the user.

However, if the user does not resolve the conflict, the program guide may resolve the conflict based on its own preference scheme. The approach used by the guide may be based on global system defaults or settings or may be specified by the user (e.g., by completing a set-up screen when the user first enters the guide).

The guide may, for example, record the program listed first in resolve conflicts screen 210 of FIG. 15 and reject the remaining programs in conflict. The program listed first is assumed preferred by the user because its recording request was submitted most recently by the user. However, the guide may use other criteria in deciding which program to record such as program start times, channel numbers, or any other suitable priority scheme. The criteria may be specified by the user or programmed as global defaults. The guide may allow the user to view the program selection as well as approve or change the selection at any time before the conflicting programs or episodes are scheduled to air. This may be accomplished, for example, from current recordings screen 190 of FIG. 14 or from any other suitable recording screen.

The guide may resolve conflicts by recording the program listed first in resolve conflicts screen 210 (or any other preferred listed program based on user-specified or system criteria) and record the remaining portion (if any) of the next preferred program in the list. The guide may allow the user to view the program selections as well as the recording sequence and may allow the user to approve or change the selections and/or recording sequence at any time before the programs are scheduled to air. This may again be accomplished, for example, from current recordings screen 190 of FIG. 14 or from any other suitable recording screen.

In another aspect of the invention, currently set reminders and currently scheduled recordings may be listed and displayed on the same program guide screen. Moreover, the user may be notified of conflicting reminders and recordings from the same program guide screen and allowed to resolve all conflicts simultaneously using any or all of the principles discussed. However, if the system is configured to allow the user to record a program while viewing a different program and thus allow the user to receive a reminder message, the system may not notify the user of conflicts or may not allow the user to resolve conflicts. Further features of an illustrative interactive television program guide with simultaneous watch and record capabilities are described in Lemmons et al. U.S. patent application Ser. No. 09/329,850, filed concurrently herewith, which is hereby incorporated by reference herein in its entirety.

Figure 17:
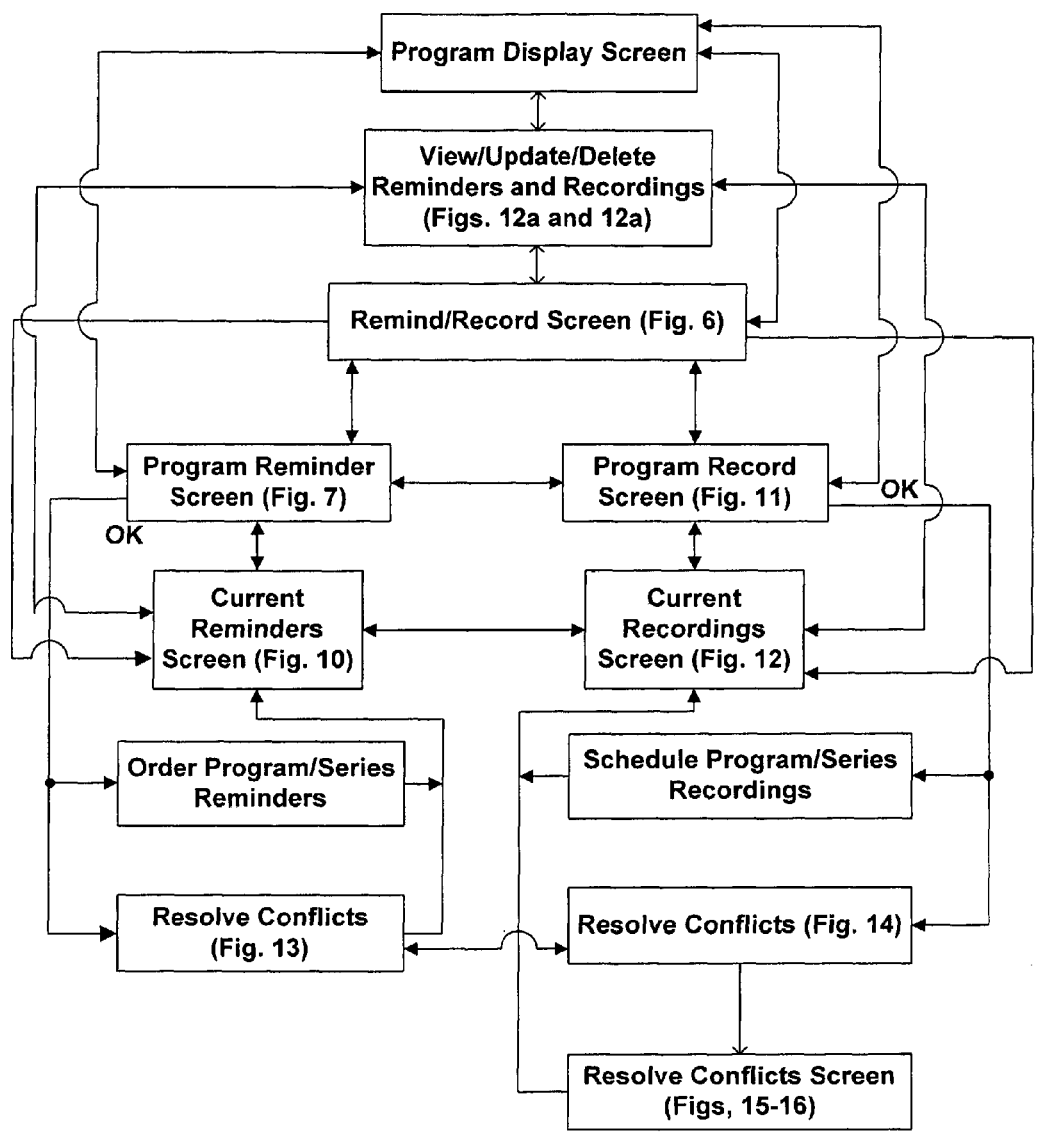
FIG. 17 is a diagram showing the interrelationships between various program guide display screens that may be selected in accordance with the present invention.

FIG. 17 is a diagram showing the interrelationship of the illustrative program guide screens used to provide the features of the invention. The features can initially be accessed from any program guide display screen such as program listings grid 50 of FIG. 5 or while watching television. When the user selects a given television program, remind/record screen 70 of FIG. 6 displays reminder option 85, record option 86, view current reminders option 87, and view current recordings option 88. View current reminders option 87, and view current recordings option 88 may also be accessed from elsewhere in the guide such as a guide menu screen. Selecting the reminder option 85 from remind/record screen 70 takes the user to program reminder screen 90 of FIG. 7 or to program reminder update screen 135 of FIG. 10*a*. Program reminder screen 90 may provide the user with several options to specify when and how often the user will be reminded of the airing of selected television programs or program series. The user may also reach program reminder screen 90 from program record screen 140 of FIG. 11 by selecting reminder option 149 or from any program guide display screen or from watching television.

The user may also access view, update, or cancel any existing set reminders or scheduled recordings by selecting a television program from a program guide display screen or from remind/record screen of FIG. 6. If the user selects a television program from a program guide display screen which has an existing reminder or scheduled recording, the user may be presented with program reminder update screen of FIG. 10*a* or program recording update screen of FIG. 12*a*.

The user may also access current reminders screen 130 of FIG. 10 by selecting view current reminders option 87 of FIG. 6 or from somewhere else in the guide such as a main menu screen. Once the user submits a reminder order, the reminder or reminders are added to (and the user may be presented with) current reminders screen 130. The user may also access current reminders screen 130 from program reminder screen 90 of FIG. 7 by selecting view current reminders option 98 or from current recordings screen 170 of FIG. 12 by selecting view current reminders option 177. While at current reminders screen 130, the user may view all current reminders and may delete or update any reminder which is no longer desired. The user may also view any reminder conflicts and may resolve the conflicts or decide to choose among the conflicting events when the scheduled programs air.

Selecting record option 86 from remind/record screen 70 of FIG. 6 takes the user to program record screen 140 of FIG. 11 or to program recording update screen of FIG. 12*a*. Program record screen 140 may provide the user with several options to complete when scheduling program recordings. The user may also reach program record screen 140 from program reminder screen 90 of FIG. 7 by selecting record option 96 or from any program display screen or from watching television.

The user may also access current recordings screen 170 of FIG. 12 by selecting view current recordings option 88 of FIG. 6 or from somewhere else in the guide such as a main menu screen. Once the user submits a request to schedule a recording, the scheduled recording or recordings are added to (and the user may be presented with) current recordings screen 170. The user may also access current recordings screen 170 from program recording screen 140 of FIG. 11 by selecting view current recordings option 143 or from current reminders screen 130 of FIG. 10 by selecting view current recordings option 137. While at current recordings screen 170, the user may view all currently scheduled recordings and may delete or update any scheduled recording which is no longer desired. The user may also view any recording conflicts and preferably may resolve any conflicts when they are detected. The user may resolve recording conflicts from resolve conflicts screen 210 of FIG. 15 by selecting resolve conflicts option 193 of current recordings screen 190 of FIG. 14 and may view or resolve conflicts from current recordings screen of FIG. 12. The user may also view and resolve conflicts between currently set reminders and currently scheduled recordings from the same program guide screen. The guide may or may not display conflicts depending on the capabilities of the system.

The foregoing is merely illustrative of the principles of this invention and various modifications can be made by those skilled in the art without departing from the scope and spirit of the invention.

What is claimed is:

1. A set top box comprising:
 a receiver operatively communicating with a television distribution facility via a link and configured to:
  receive a data stream from the television distribution facility including series information data for a plurality of programs that indicates which programs are episodes of a series of programs; and
  receive a video stream of a program from the television distribution facility at a future scheduled time;
 control circuitry configured to:
  determine whether the program is an episode of the series of programs using the series information data;
  cause a television monitor to display a program listing for the program; and
  in response to a user selection of the program listing, cause the television monitor to display a first option to record only first run episodes of the series of programs, and display a second option to record all episodes of the series of programs; and
 a recording device configured to initiate a recording of the video stream of the program at the future scheduled time in accordance with a user selection of the first option or the second option.

2. The set top box of claim 1, wherein the control circuitry is further configured to:
 determine a recording schedule in accordance with user selection of the first or second option; and
 send a recording signal to the recording device to record the program in accordance with the recording schedule associated with the program.

3. The set top box of claim 2, wherein the control circuitry is further configured to:
 receive an updated selection of the first option or the second option; and
 determine an updated recording schedule in accordance with the updated selection.

4. The set top box of claim 1, wherein the control circuitry is further configured to:
 in response to the user selection of the first option, cause a search of a programming database to identify all episodes of the series of programs to be broadcast for a first time.

5. The set top box of claim 4, wherein the programming database is accessed through the television distribution facility through the link.

6. The set top box of claim 1, wherein the control circuitry is further configured to:
 in response to the user selection of the second option, cause a search of a programming database to identify all episodes of the series of programs.

7. The set top box of claim 1, wherein the control circuitry is further configured to:
 cause the television monitor to display a cancel option to cancel a recording of the program; and cause the television monitor to display an update option to update programming information related to the program.

8. The set top box of claim 1, wherein the control circuitry is further configured to:
cause the television monitor to display an option to schedule a recording for particular episodes that are part of the series based on one or more of:
a selected channel on which the program is to be broadcast;
all channels;
a selected day of the week on which the program is to be broadcast; and
all days of the week;
determine a recording schedule in accordance with a user selection of the option; and
send a recording signal to the recording device to record the program in accordance with the recording schedule associated with the program.

9. The set top box of claim 1, wherein the receiver is a high definition television (HDTV) receiver and the link is a high-bandwidth satellite link.

10. A user television equipment comprising:
a receiver configured to receive series information data for a plurality of programs that indicates a subset of programs of the plurality of programs that are episodes of a series of programs;
a recording device configured to record a program transmitted to the user television equipment over a high bandwidth link; and
control circuitry operatively coupled to the receiver and the recording device and configured to:
determine that the program is an episode of the series of programs using the series information data;
cause a television monitor to display a first option to record only first run episodes of the series of programs;
cause the television monitor to display a second option to record all episodes of the series of programs;
in response to a user selection of the first option or the second option, create a recording request having recording criteria;
cause a search of a program database via the link to identify a plurality of episodes that match the recording criteria;
determine a recording schedule for each episode of the plurality of episodes; and
send a recording signal to the recording device to record the program in accordance with the recording schedule associated with the program.

11. The user television equipment of claim 10, wherein:
in response to a selection of the first option, the search of the program database identifies episodes of the series of programs that are scheduled to be broadcast for the first time; and
in response to a selection of the second option, the search of the program database identifies all episodes of the series of programs that are scheduled to be broadcast.

12. The user television equipment of claim 10, wherein the control circuitry is further configured to:
cause the display of a program recording update screen including a third option to cancel a recording of the program; and
in response to a user selection of the third option to cancel, cancel the recording schedule associated with the program.

13. The user television equipment of claim 10, wherein the control circuitry is further configured to:
cause the display of a program update screen including an option to update a recording of the program; and
in response to a user selection of the option to update the recording of the program:
determine updated recording criteria;
initiate an updated search of program database to identify episodes that match the updated recording criteria; and
determine an updated recording schedule for each episode of the plurality of episodes.

14. The user television equipment of claim 10, wherein the recording schedule is determined by a remote television distribution facility and transmitted to the user television equipment via the link.

15. The user television equipment of claim 10, wherein the program database is accessed through a television distribution facility via the link.

16. A television program distribution system comprising:
a television distribution facility configured to:
transmit data signals including series information data for a plurality of programs that indicates which programs are episodes of a series of programs; and
transmit video signals including a program of the plurality of programs;
user television equipment configured to receive the video signals from the television distribution facility, the television equipment comprising:
a remote control device for receiving user input commands;
a video output operatively coupled to a television display;
a recording device configured to record a program; and
control circuitry configured to:
determine whether the program is an episode of the series of programs using the series information data;
output a program guide screen to the television display including a first option to record only first run episodes of the series of programs and a second option to record all episodes of the series of programs;
receive a user selection of the first option or the second option via the remote control device;
determine a recording schedule for the program; and
send a recording signal to the recording device to record the program in accordance with the recording schedule.

17. The television program distribution system of claim 16, wherein:
the television distribution facility provides access to a programming database; and
the control circuitry is further configured to:
determine recording criteria based on the user selection;
cause a search of the program database to identify a plurality of episodes that match the recording criteria; and
determine the recording schedule based on each episode of the plurality of episodes.

18. The television program distribution system of claim 17, wherein the control circuitry is further configured to:
in response to a user selection of the first option, causing a search of the programming database to identify all episodes of the series of programs to be broadcast for a first time.

19. The television program distribution system of claim 16, wherein the control circuitry is further configured to:
    cause the display of a program update screen including an option to update a recording of the program; and
    in response to a user selection of the option to update the recording of the program:
        access a programming database via the television distribution facility to identify a plurality of episodes that match updated recording criteria; and
        determine an updated recording schedule for each episode of the plurality of episodes.

20. The television program distribution system of claim 16, wherein the television distribution facility is configured to:
    transmit the data signals over a first link; and
    transmit the video signals over a second link having a higher bandwidth than the first link.

* * * * *